(12) United States Patent
Britton

(10) Patent No.: US 8,250,108 B1
(45) Date of Patent: Aug. 21, 2012

(54) METHOD FOR TRANSFERRING DATA INTO DATABASE SYSTEMS

(75) Inventor: Bruce Wayne Britton, Santa Clarita, CA (US)

(73) Assignee: Teradata US, Inc., Dayton, OH (US)

( * ) Notice: Subject to any disclaimer, the term of this patent is extended or adjusted under 35 U.S.C. 154(b) by 2642 days.

(21) Appl. No.: 10/361,140

(22) Filed: Feb. 7, 2003

(51) Int. Cl.
*G06F 17/30* (2006.01)
(52) U.S. Cl. ........................ 707/802; 707/791
(58) Field of Classification Search ............ 707/1–10, 707/100–104.1, 200–205, 791, 802, 822
See application file for complete search history.

(56) References Cited

U.S. PATENT DOCUMENTS 6,256,624 B1 * 7/2001 Pollard et al. .................... 707/3

* cited by examiner

*Primary Examiner* — Shahid Alam
(74) *Attorney, Agent, or Firm* — Howard Speight

(57) ABSTRACT

A method, computer program, and computer network are disclosed for transferring data to a database system. The method includes preparing a plurality of input records, each including a plurality of fields and a selector configurable to represent a plurality of states. For each input record of the plurality of input records, the following steps are performed. A state represented by the selector for an input record is read. Based on the state represented by the selector, a subset of the fields for the input record is transferred to the database system.

16 Claims, 5 Drawing Sheets

METHOD FOR TRANSFERRING DATA INTO DATABASE SYSTEMS

BACKGROUND

This invention pertains generally to the field of database system management. In particular, the present invention includes a method of transferring data into database systems.

Data stored in database systems is often received from other computers, sometimes called client computers, that store the data for a different purpose or for different types of access. The client computer can store extraneous data intermixed with data to be included in the database system. Database systems often organize the stored data in a tables. For example, relational database management systems can be configured by tables. In a conventional process, data can be sent from the client computer to the database system without distinguishing extraneous data. The database system then determines which portions of the received data are needed for its tables and which portions are extraneous.

The portions of the data that are needed by a database system can depend upon the operation to be performed on the database system tables. For example, an insert operation, which adds a new row or record to a table of the database system, requires all the data to be included in that row. A delete operation, on the other hand, just needs enough data to identify the row or rows to be removed. An update operation requires data for the portions of the row or rows to be modified as well as data identifying the row or rows to be modified.

A conventional process for transferring data to a database system can include having a user specify particular data items that are to be transferred to the database system and other data items that are not. If a large number of records are involved and different records require different treatment, this may not be efficient.

SUMMARY

In general, in one aspect, the invention features a method for transferring data to a database system. The method includes preparing a plurality of input records, each including a plurality of fields and a selector configurable to represent a plurality of states. For each input record of the plurality of input records, the following steps are performed. A state represented by the selector for an input record is read. Based on the state represented by the selector, a subset of the fields for the input record is transferred to the database system.

Implementations of the invention may include one or more of the following. The fields of the input records can overlap. The selector can represent a state corresponding to two or more database system operations with the associated fields only being sent once.

In general, in another aspect, the invention features a computer program for transferring data stored in a plurality of input records, each including a plurality of fields and a selector configurable to represent a plurality of states, to a database system. The program include executable instructions that cause a computer to perform the following steps are performed for each input record of the plurality of input records. A state represented by the selector for an input record is read. Based on the state represented by the selector, a subset of the fields for the input record is transferred to the database system.

In general, in another aspect, the invention features a computer network for maintaining corresponding data on a client and a relational database management system server. The computer network includes a client computer that stores a plurality of input records, each including a plurality of fields and a selector configurable to represent a plurality of states. The computer network also includes a database system having: one or more nodes; a plurality of CPUs, each of the one or more nodes providing access to one or more CPUs; and a plurality of virtual processes, each of the one or more CPUs providing access to one or more virtual processes, each virtual process configured to manage data, including rows organized in tables, stored in one of a plurality of data-storage facilities. The computer network also includes a transfer agent coupled to the client computer and the database system. For each input record, the transfer agent is configured to read a state represented by the selector for that input record and, based on the state represented by the selector, transfer a subset of the fields for the input record from the client computer to the database system

DETAILED DESCRIPTION

Figure 4:
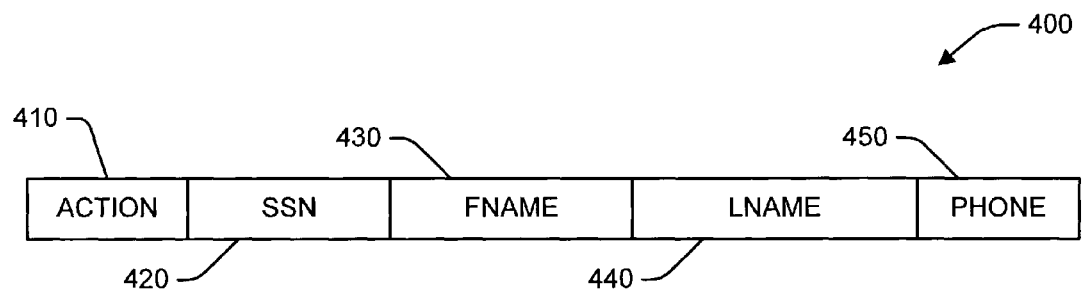
FIG. 4 is a diagram of an example input record.
Figure 6:
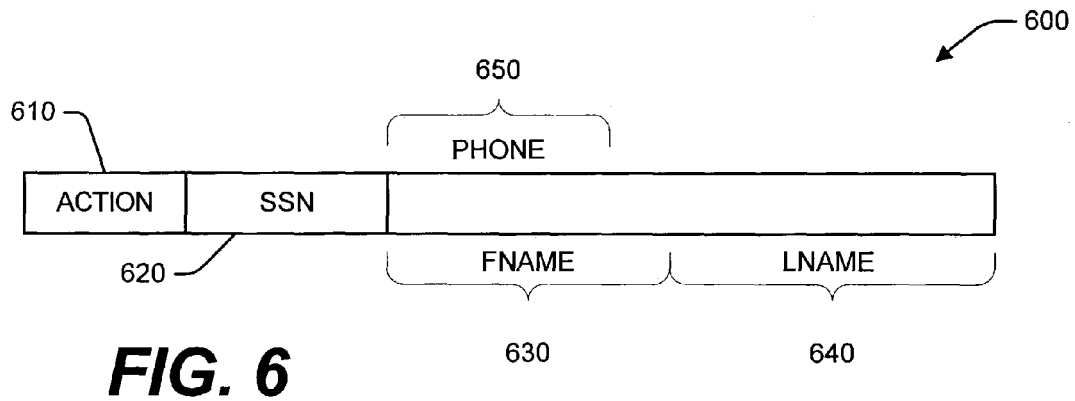
FIG. 6 is a diagram of an example input record.

The data transfer technique disclosed herein can be performed between a client computer 50 and a database system 100 by means of a transfer agent 80. The database system includes data stored in tables. The client computer 50 includes a storage device 60. The storage device 60 can be any computer-accessible storage such as dynamic random access memory ("DRAM"), hard drives, and optical drives, among others. Input records 70 are stored in the storage device 60. FIGS. 4 and 6 depict implementations of the input records in more detail. In one implementation, the transfer agent 80 is a software program that is stored on the client computer 50. In other implementations, the transfer agent 80 is software stored on the database system 100, partly on the database system 100 and partly on the client computer 50, or on a network device coupled between the database system 100 and the client computer 50. In one implementation, the client computer 50 is networked and shares its data storage and retrieval functions with additional client computers 90. As indicated by the dotted line, the additional client computers 90 can be connected to the database system 100 through the transfer agent 80.

The transfer agent 80 is configured to provide the database system 100 with the portions of the input records 70 that it requires. The input records 70 can specify commands to modify the tables stored in the database system 100 and the data required to carry out those commands. In one implementation, some of the input records 70 include data that is extraneous because it is not required to carry out the command specified for that input record. In another implementation, input records 70 are formatted with overlapping fields so that different data is provided depending on the specified command. In another implementation, input records 70 specify multiple commands to be executed on one or more tables in the database system 100. The transfer agent 80 determines the configuration of the input records 70 and, based on that configuration, provides the database system 100 with the required portion of the data.

Figure 1:
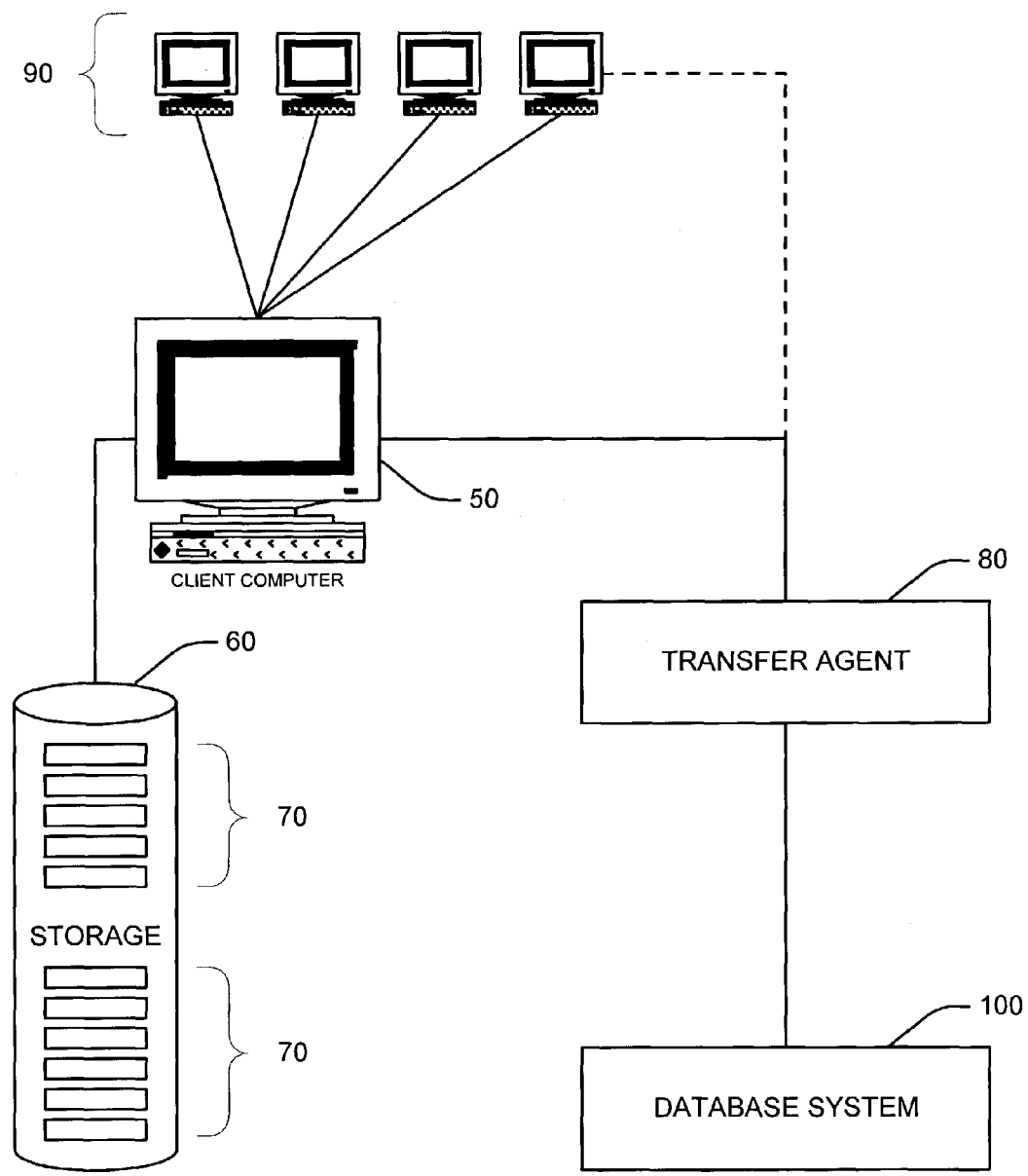
FIG. 1 is a block diagram of a computer network.
Figure 2:
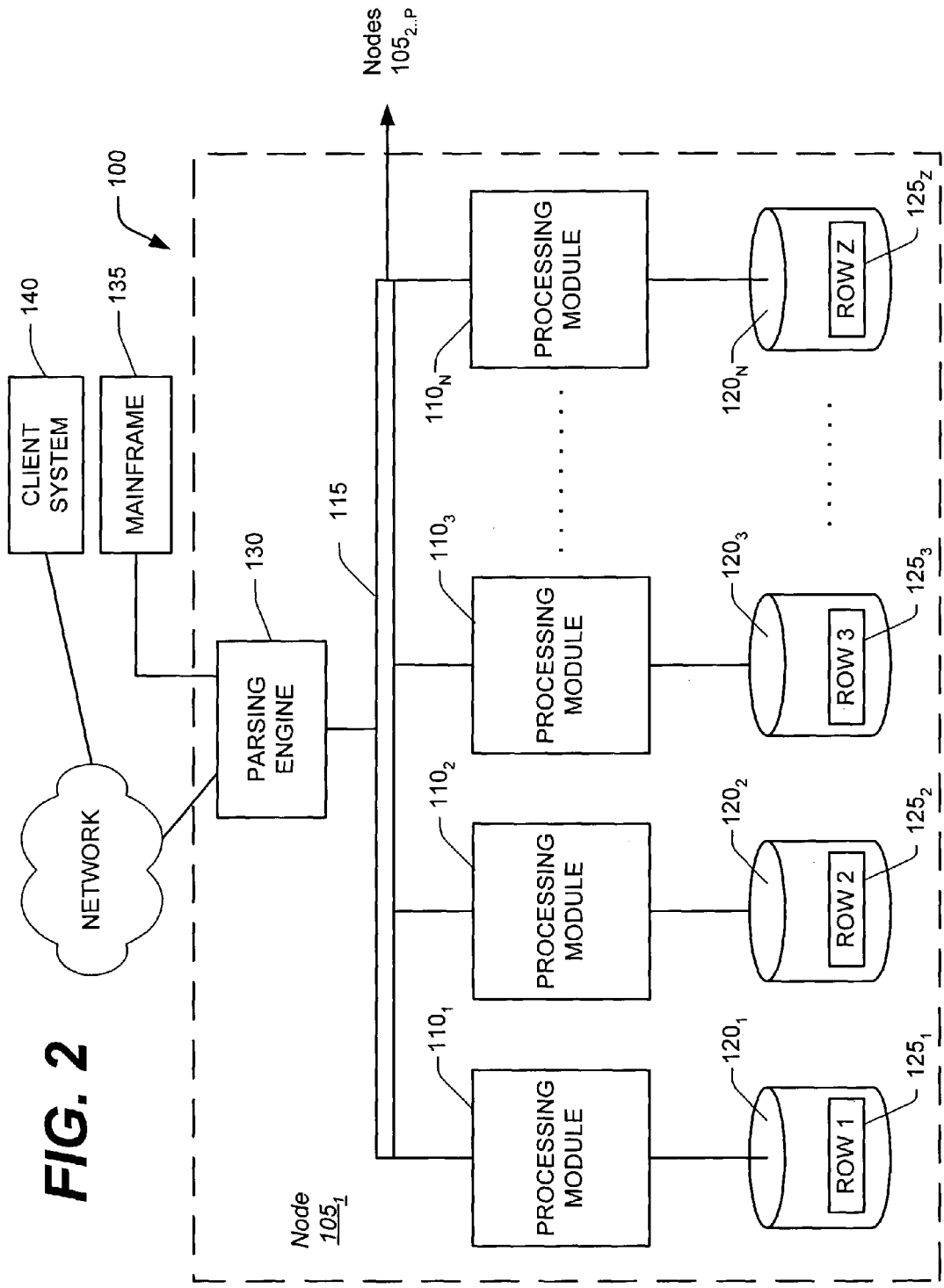
FIG. 2 is a block diagram of a node of a parallel processing database system.

The data transfer technique disclosed herein has particular application, but is not limited, to large databases that might contain many millions or billions of records managed by the database system ("DBS") 100, such as a Teradata Active Data Warehousing System available from NCR Corporation. FIG. 2 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...P}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 3:
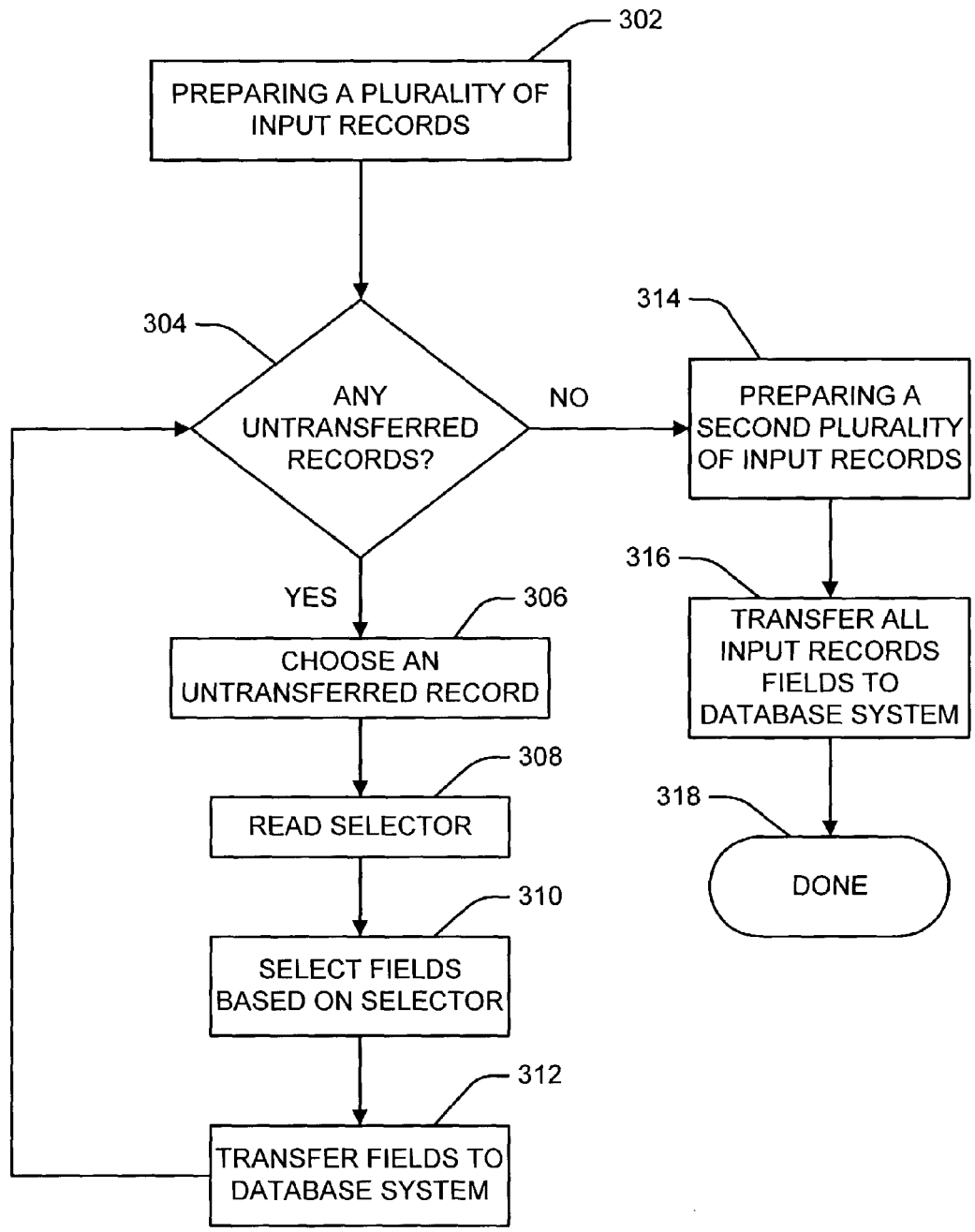
FIG. 3 is a flow chart of one method for transferring data into a database system.
Figure 5:
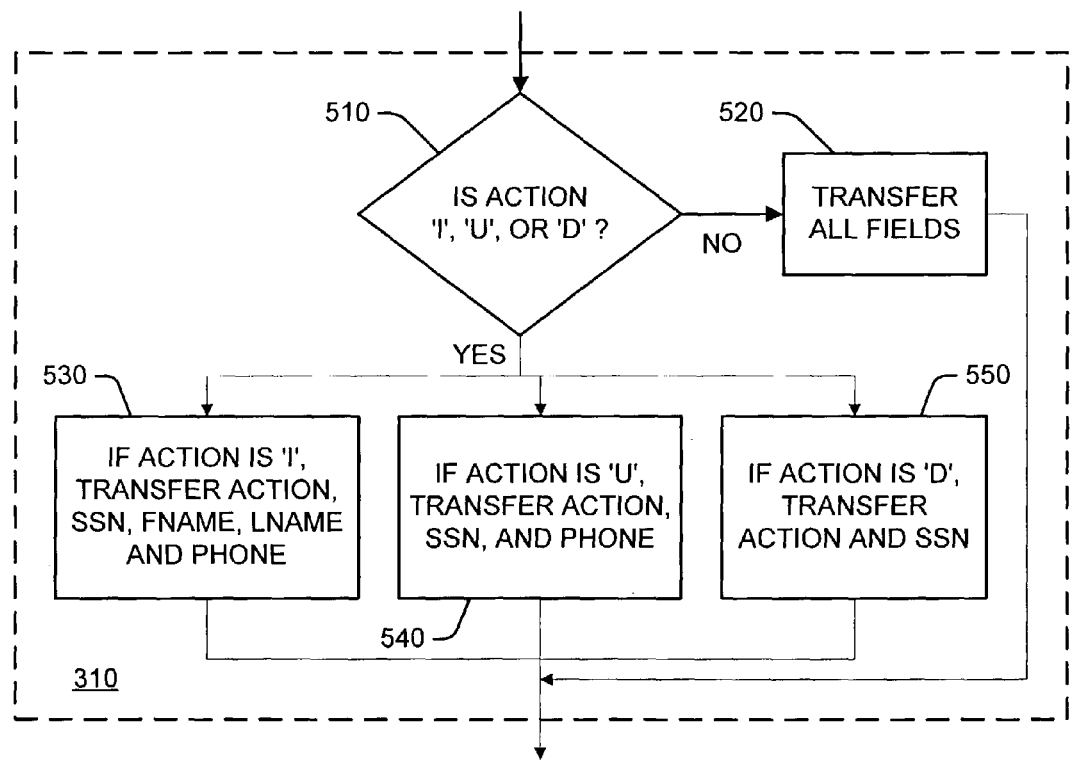
FIG. 5 is a flow chart of one method of selecting fields.
Figure 7:
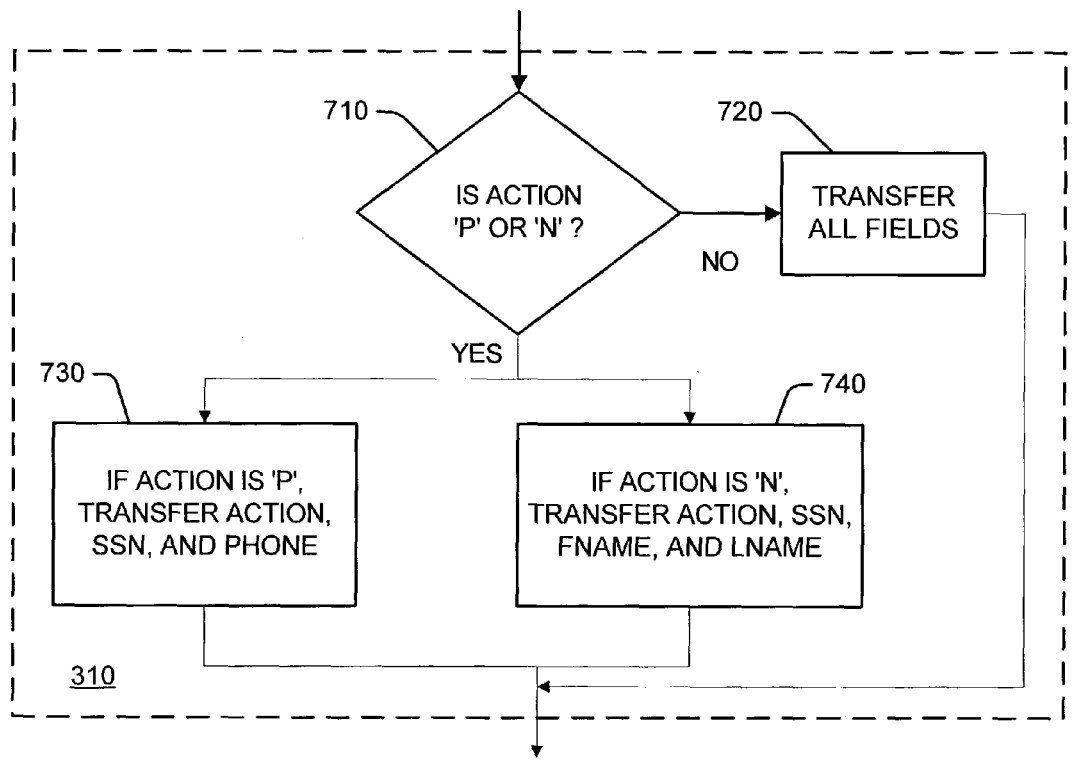
FIG. 7 is a flow chart of one method of selecting fields.

FIG. 3 depicts one method of transferring data to a database system. A plurality of input records are prepared 302. In one implementation, each input records includes a plurality of fields. One of the fields is a selector that is configurable to represent a plurality of states. For example, the selector can be set to different letters, each of which indicates a particular command. If there are any untransferred records 304, then one of those records is selected 306. The selector for that record is read 308. Based on the state of the selector, a subset of fields is selected 310. FIGS. 5 and 7 depict in more detail the process of selecting fields based on the state of the selector 310. The selected fields are then transferred to the database system 312.

Once the selected fields for all the input records in the prepared plurality are transferred 304, in one embodiment a second plurality of input records are prepared 314. All the fields of the second plurality of input records are transferred to the database system 316. In another embodiment, input records the fields of which are selectively transferred based on the selector state are intermixed with input records that are transferred as a whole. Once all the prepared input records have been transferred, either selectively or in whole, the method ends 318.

FIG. 4 is a diagram of an example input record 400. The action field 410 allows the client computer 50 to have more than one transaction type that are indicated by the state of the action field 410. The action field is one embodiment of a selector. In one embodiment, the action field 410 is a single character field with 'I', 'U', and 'D' as valid states that correspond to insert, update, and delete transaction types. In one embodiment, the social security number 420 is the primary index of the table in the database system that is being modified by the transaction corresponding to the input record. Each row in the table includes a social security number and no two social security numbers match because there is only one row per person in the table. Each input record 400 also includes fields for the person's first name 430, last name 440, and phone number 450. In one embodiment, the relationship between the various possible transaction types and input record fields are defined by the following:

.LAYOUT iud;
.FIELD action*CHAR(1); /*could be FILLER to avoid sending to DBS*/
.FIELD ssn*CHAR(9) KEY;
.FIELD fname*CHAR(20);
.FIELD lname*CHAR(30);
.FIELD phone*CHAR(10);
.DML LABEL ins;
INSERT INTO phonelist VALUES (:ssn,:fname,:lname,:phone);
.DML LABEL upd;
UPDATE phonelist SET phone=CASE:phone="THEN phone ELSE:phone END
WHERE ssn=:ssn; /*Only phone and ssn needed*/
.DML LABEL del;
DELETE FROM phonelist WHERE ssn=:ssn; /*Only ssn needed*/
.IMPORT INFILE datafile LAYOUT iud
APPLY ins WHERE action='I'
APPLY upd WHERE action='U'
APPLY del WHERE action='D';

The text surrounded by /* */'s indicates a comment rather than defining text. For example, the comment regarding the action field indicates that that field can be sent to the database system in one embodiment and not sent to the database system in another embodiment. The transaction definitions also indicate that different amounts of data are sent to the database system depending on the type of transaction indicated in the action field 410. If the action is an insert, each of the social security number 420, first name 430, last name 440, and phone 450 need to be sent to the database system because a new record will be created in the table. For a delete, only the social security number 420 is required because it uniquely indicates the row to be removed. The update defined in this embodiment is only an update of the phone number 450 so only that number and the social security number 420 (to identify the row whose phone number needs to be changed) must be transferred. If all of the data were sent for each type of transaction, 50 extra bytes would be sent for an update action (the name fields 430, 440) and 60 extra bytes would be sent for a delete action (the phone field 450 and the name fields 430, 440).

FIG. 5 depicts a flow chart of one method of selecting fields 310. The flow chart corresponds to the format of input record 400. The action field is checked for a known action 510. If the action is not one of the known formats, all fields are transferred to the database system 520. If the action field is a known format 510, one of three transfers occurs based on the state of the action field 410. An 'I' in the action field is interpreted as an insert transaction type so that all fields are transferred to the database system 530. A 'U' in the action field is interpreted as an update transaction type so that the action, phone, and social security fields are transferred to the database system 540. A 'D' in the action field is interpreted as a delete transaction type so that the action and social security fields are transferred to the database system 550. As discussed above, in one embodiment the action field is not transferred for any of the transaction types.

FIG. 6 is a diagram of an example input record 600. An action field 610 and social security number field 620 are included. Overlapping fields make up the remaining portion of the input record 600. For one transaction type, first name 630 and last name 640 fields are defined as following the social security number field 620. For another transaction type, only a phone number field 650 is defined as following the social security number field 620. In one embodiment, the social security number 420 is the primary index of the table in the database system that is being modified by the transaction corresponding to the input record. In one embodiment, the relationship between the various possible transaction types and input record fields are defined by the following:

```
.LAYOUT overlap;
.FIELD action*CHAR(1); /*common*/
.FIELD ssn*CHAR(9) KEY; /*common*/
.FIELD fname 11 CHAR(20); /*action=N*/
.FIELD lname*CHAR(30); /*action=N*/
.FIELD phone 11 CHAR(10); /*action=P*/
.DML LABEL uphone;
UPDATE phonelist SET phone=:phone WHERE ssn=:ssn;
/*Only phone and ssn needed*/
.DML LABEL uname;
UPDATE phonelist SET fname=:fname, lname=:lname
WHERE ssn=:ssn; /*Only fname, lname, and ssn needed*/
.IMPORT INFILE datafile LAYOUT overlap
APPLY uphone WHERE action='P'
APPLY uname WHERE action='N';
```

The two transaction types are defined to update either the phone number or the first and last names depending upon the selector state, e.g., the text in the action field. The overlap is indicated by the start point of both the fname field and the phone field at character 11. FIG. 7 depicts a flow chart of one method of selecting fields 310. The flow chart corresponds to the format of the overlapping fields input record 600. The action field is checked for a known action 710. If the action is not one of the known formats, all fields are transferred to the database system 720. If the action field is a known format 710, one of two transfers occurs based on the state of the action field 610. A 'P' in the action field is interpreted as an update phone number transaction type so that the action, social security number and phone number fields are transferred to the database system 730. An 'N' in the action field is interpreted as an update name transaction type so that the action, social security number, first name and lastname fields are transferred to the database system 740. As discussed above, in one embodiment the action field is not transferred for any of the transaction types.

In another embodiment, a single input record can include two different transactions. For example, the data in an input record could be used to update two different tables in the database system. The following defines one example of such a situation:

```
.LAYOUT twin;
.FIELD empno    * CHAR(5) KEY;
.FIELD deptno   * CHAR(4);
.FIELD mgrflag  * CHAR(1);  /* could be FILLER to avoid sending
                               to DBS */
.DML LABEL setdept;
UPDATE emptbl SET deptno = :deptno WHERE empno = :empno;
.DML LABEL setmgr;
UPDATE depttbl SET mgrno = :empno WHERE deptno = :deptno;
.IMPORT INFILE datafile LAYOUT twin
APPLY setdept
APPLY setmgr WHERE mgrflag = 'Y';
```

The input record includes fields for employee number, department number, and a manager flag field that acts as a selector. Every input record is associated with a transaction of updating the department number for the row of the employee table corresponding to the employee number. The employee table in this case has a primary index based on the employee number. If the manager flag field contains the value 'Y', the input record is also associated with a second transaction that updates the manager number field in the department table based on the department number. The department table in this case has a primary index based on the department number. The input record fields are only sent once and the action field or some other data indicates whether one or two transactions are required.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for transferring data to a database system, comprising the steps of:
   (a) preparing a plurality of input records, each including a plurality of fields and a selector configurable to represent a plurality of states;
   (b) for each input record of the plurality of input records, performing steps c and d;
   (c) reading a state represented by the selector for an input record; and
   (d) based on the state represented by the selector, transferring a subset of the fields for the input record to the database system.

2. The method of claim 1 where each input record is associated with a table stored in the database system and a first field of each input record includes a value that is unique for that field in that table.

3. The method of claim 1 further comprising the steps of:
   (e) preparing a second plurality of input records, each record having a plurality of fields and
   (f) transferring all the fields of the second plurality of input records to the database system.

4. The method of claim 1 where a first input record of the plurality of input records includes a selector representing an insert state and step (d) includes transferring all the fields of the first input record to the database system.

5. The method of claim 1 where each input record is associated with a table stored in the database system, a first field of each input record includes a value that is unique for that field in that table, a first input record of the plurality of input records includes a selector representing a delete state, and step (d) includes transferring only the first field of the first input record and the selector to the database system.

6. The method of claim 1 where step (d) includes transferring the selector for each input record.

7. The method of claim 1 where the plurality of fields include first and second sets of overlapping fields.

8. The method of claim 1 where a first input record includes a selector representing a first state corresponding to two database system operations that utilize the fields of the first input record and step (d) includes transferring the fields of the first input record once.

9. A computer program, stored on a tangible storage medium, for transferring data stored in a plurality of input records, each including a plurality of fields and a selector configurable to represent a plurality of states, to a database system, the program including executable instructions that cause a computer to:
 (a) for each input record of the plurality of input records, perform steps (b) and (c);
 (b) read a state represented by the selector for an input record; and
 (c) based on the state represented by the selector, transfer a subset of the fields for the input record to the database system.

10. The computer program of claim 9 where each input record is associated with a table stored in the database system and a first field of each input record includes a value that is unique for that field in that table.

11. The computer program of claim 9 further comprising executable instructions that cause a computer to:
 (d) transfer all fields of a second plurality of input records to the database system.

12. The computer program of claim 9 where a first input record of the plurality of input records includes a selector representing an insert state and step (c) includes transferring all the fields of the first input record to the database system.

13. The computer program of claim 9 where each input record is associated with a table stored in the database system, a first field of each input record includes a value that is unique for that field in that table, a first input record of the plurality of input records includes a selector representing a delete state, and step (c) includes transferring only the first field of the first input record and the selector to the database system.

14. The computer program of claim 9 where step (c) includes transferring the selector for each input record.

15. The computer program of claim 9 where the plurality of fields include first and second sets of overlapping fields.

16. The computer program of claim 9 where a first input record includes a selector representing a first state corresponding to two database system operations that utilize the fields of the first input record and step (d) includes transferring the fields of the first input record once.

* * * * *